(12) United States Patent
Cruson (10) Patent No.: US 8,453,586 B2
(45) Date of Patent: Jun. 4, 2013

(54) FURROW OPENER WITH REAR FACING PRIMARY OUTLET

(75) Inventor: Brian Cruson, Rosedale (CA)

(73) Assignee: Dutch Blacksmith Shop Ltd.

( * ) Notice: Subject to any disclaimer, the term of this patent is extended or adjusted under 35 U.S.C. 154(b) by 301 days.

(21) Appl. No.: 12/853,363

(22) Filed: Aug. 10, 2010

(65) Prior Publication Data

US 2011/0030595 A1  Feb. 10, 2011

(30) Foreign Application Priority Data

Aug. 10, 2009  (CN) ...................................... 2674714

(51) Int. Cl.
*A01C 7/06* (2006.01)
*A01C 21/02* (2006.01)
*A01C 23/025* (2006.01)

(52) U.S. Cl.
USPC ............ 111/124; 111/125; 111/152; 111/153

(58) Field of Classification Search
USPC ................. 111/152, 149, 154, 118, 120–126, 111/153; 172/699, 700, 721–727, 730, 732, 172/733
See application file for complete search history.

(56) References Cited

U.S. PATENT DOCUMENTS
6,332,412 B1  12/2001  Swab et al.

FOREIGN PATENT DOCUMENTS
CA       2326468       4/2005

*Primary Examiner* — Christopher J Novosad
(74) *Attorney, Agent, or Firm* — Ryan W. Dupuis; Kyle R. Satterthwaite; Ade & Company Inc.

(57) ABSTRACT

A furrow opener comprises an opener body for mounting on a cultivator shank for movement therewith in a forward working direction and which supports a knife on a front end to deposit a fertilizer row and a wing attachment at a rear end to deposit paired seed rows in the ground. The bottom side of the opener body is stepped in profile between the knife and the wing attachment to comprise an enclosed front portion extending generally horizontally rearward from the knife, a step portion which extends upward from the front portion and primarily locates a fertilizer outlet therein and a rear portion extending generally rearward from the step portion to the rear of the opener body. The fertilizer outlet in the step portion primarily faces rearwardly and is more vertical in orientation than the enclosed front portion of the bottom side of the opener body ahead of it to shield the fertilizer outlet from the wake of earth displaced by the knife.

18 Claims, 10 Drawing Sheets

“FURROW OPENER WITH REAR FACING PRIMARY OUTLET”

This application claims foreign priority benefits from Canadian Patent Application 2,674,714, filed Aug. 10, 2009.

FIELD OF THE INVENTION

The present invention relates to a furrow opener for mounting on a shank of a cultivator including a primary outlet opening from which a primary material is deposited into the furrow formed by the furrow opener in a forward working direction of the cultivator, and more particularly the present invention relates to a primary outlet opening in a furrow opener which primarily faces rearward.

BACKGROUND

Various devices are known for depositing seed in a paired row in which the rows are deposited spaced upwardly and laterally outwardly from opposing sides of a fertilizer row. Examples of paired row openers can be found in Canadian patent 2,326,468 by Dutch Blacksmith Shop Ltd. and U.S. Pat. No. 6,332,412 by Flexi-Coil Ltd. In each instance an opener body is supported on a cultivator shank upon which there is supported a knife at a front end of the opener body and a pair of rear wings extending outwardly from opposing sides of the opener body at the rear end. A fertilizer outlet is located at a bottom side of the opener body for depositing fertilizer in a primary furrow formed by the knife. A pair of seed outlets are formed behind the rear wings respectively for depositing the seed in a paired row in respective secondary furrows formed by the wings.

In each instance in the prior art the size of the opener body is minimized so as to attempt to minimize manufacturing cost as well as minimize the amount of soil disturbed when displacing the opener through the ground to form the furrow. As the height between the knife at the front end and the wings at the rear end is generally dictated by optimal placement of the seed rows relative to the fertilizer row, the resulting profile of the bottom side of the opener sloping upwardly and rearwardly from the knife to the wings where the fertilizer outlet is located is relatively consistent in all prior art devices. The resulting plane of the fertilizer outlet extends at an upward and rearward incline which tends to be closer to horizontal than vertical as dictated by the sloping direction of the opener body from the knife to the wings. In this orientation however the outlet tends to collect mud which is displaced in the wake of the knife forming the primary furrow so that under certain conditions, the mud has a high tendency of plugging the fertilizer outlet so that fertilizer is not adequately deposited in relation to the seed rows.

SUMMARY OF THE INVENTION

According to one aspect of the invention there is provided a furrow opener for mounting on a cultivator shank for being supported for movement together with the cultivator shank in a forward working direction for depositing into the ground a primary material from a primary delivery tube and a secondary material from a secondary delivery tube, the opener comprising:

an opener body arranged to be mounted on the cultivator shank, the opener body including a bottom side extending rearward from a front end to a rear end of the opener body;

a knife arranged to be supported on the front end of the opener body to extend downwardly and forwardly from the opener body so as to be arranged to form a primary furrow in the ground in the forward working direction;

a primary passage extending through the opener body from a primary inlet opening arranged to communicate with the primary delivery tube to a primary outlet opening in the bottom side of the opener body so as to be arranged to deposit the primary material in the primary furrow therefrom;

at least one wing arranged to be supported on the rear end of the opener body to extend laterally outward from the opener body so as to be arranged to form a secondary furrow in the ground in the forward working direction offset laterally in relation to the primary furrow; and a secondary passage extending from a secondary inlet arranged to communicate with the secondary delivery tube to a secondary outlet opening at a rear end of said at least one wing so as to be arranged to deposit the secondary material in the secondary furrow;

the bottom side of the opener body being stepped in profile such that the bottom side of the opener body comprises:

a front portion which is enclosed at the bottom side and which extends rearwardly from the front end of the opener body to a trailing edge; and a step portion which is upright in orientation and extends upwardly from the trailing edge of the front portion so as to be more vertical in orientation than the front portion;

the primary outlet opening being primarily located in the step portion of the bottom side of the opener body such that the primary outlet opening primarily faces rearwardly.

By providing a bottom side of the opener body which is stepped in profile having an enclosed front portion ahead of the step portion locating the primary outlet opening therein, the front portion serves to divert the wake of earth displaced by the knife away from the primary outlet while the primary outlet can be oriented in a more vertical and rear facing orientation than the orientation which would be normally dictated by the continuous sloped profile of the bottom of the opener body between the knife and the wings in prior art devices.

Preferably the front portion of the bottom side comprises a lowermost portion of the opener body which is substantially horizontal in orientation and which spans in the working direction a majority of a length of the opener body between the front end and the rear end of the opener body. Furthermore, the front portion of the bottom side of the opener body preferably spans in the working direction a distance which is greater than a horizontal distance between opposed top and bottom edges of the primary outlet opening.

The primary outlet opening is preferably nearer to the rear end of the opener body supporting said at least one wing thereon than the front end of the opener body supporting the knife thereon. More preferably, when the primary outlet opening extends upwardly and rearwardly from a leading bottom edge to a trailing top edge, preferably the leading bottom edge of the primary outlet opening is nearer to the rear end of the opener body supporting said at least one wing thereon than the front end of the opener body supporting the knife thereon.

The front portion of the bottom side of the opener body may extend rearwardly at a downward inclination from the front end supporting the knife thereon to the primary outlet opening in the step portion.

The step portion primarily locating the primary outlet opening therein is preferably substantially vertical in orientation.

The step portion may span a height corresponding to a difference in elevation between the knife and said at least one wing.

Preferably the primary outlet opening extends between a leading bottom edge at the trailing edge of the front portion of the bottom side of the body and a trailing top edge which is spaced upwardly and rearwardly from the leading bottom edge spaced forwardly of said at least one wing.

When the front portion of the bottom side of the opener body comprises a plate member, preferably a top side of the plate is open to the primary passage directly thereabove.

When the bottom side of the opener body also comprises a rear portion extending rearwardly from a top end of the step portion to the rear end of the body supporting said at least one wing thereon, preferably the front portion and the rear portion are substantially horizontal in orientation and the step portion is upright in orientation between the front portion and the rear portion.

In some embodiments, the primary outlet opening is located in both the step portion and the rear portion of the bottom side of the opener body.

In alternative embodiments, the primary outlet opening is wholly located in the step portion of the bottom side of the opener body which is upright in orientation such that the primary outlet opening only faces rearwardly.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a furrow opener generally indicated by reference numeral 10. The opener 10 is particularly suited for use with a cultivator having a plurality of implement shanks 12 arranged to support respective ones of a plurality of the openers 10. Each opener 10 is mounted on a respective shank so that it is arranged for movement therewith in the forward working direction of the cultivator.

The cultivator typically comprises a primary delivery tube associated with each shank for depositing a primary material for example liquid or granular fertilizer therethrough into the ground as well a secondary delivery tube associated with each shank for similarly depositing a second material therethrough, for example seed to be deposited in a respective row in the ground offset from the primary material.

Although various embodiments are described and illustrated in the accompanying specification, the common features of the various embodiments will first be described herein.

In each instance the opener 10 comprises an opener body 14 which mounts onto the implement shank at a top end of the body by a shank mounting plate 16 having suitable fastener apertures therein for fastening along the front side of the shank. The opener further comprises a pair of opposed side walls 18 extending generally in the forward working direction parallel and spaced apart from one another to extend forwardly from opposing sides of the shank mounting plate 16 to a front wall 20 of the opener body as well as extending downwardly to a bottom side 22 of the opener body at the bottom end thereof. The front wall 20 is sloped downwardly and forwardly and spans between the side walls 18 forward of the shank mounting plate 16 to define a hollow interior of the opener body comprising a primary passage 24 ahead of the shank which extends downwardly through the opener body from a primary inlet opening 26 at the top end arranged to communicate the primary delivery tube of the cultivator to a primary outlet opening 28 in the bottom side 22 of the opener body.

The bottom side and the front wall of the opener body are joined at a forwardmost portion of the opener body which locates a knife mount 30 thereon between the side walls which projects forwardly into the forward working direction. The knife mount 30 is arranged to be received within the rear socket of a knife body 32 of a replaceable knife mounted on the front end of the opener body by the knife mount 30. The knife body extends downwardly and forwardly to a tip which is spaced forwardly and below the opener body for forming a primary furrow in the ground as the opener is displaced in the forward working direction of the cultivator.

The side walls of the opener body extend downwardly and rearwardly below the shank mount to a rear end of the opener body spaced below the shank mount so as to support a wing attachment 34 thereon at a position rearward of the shank mounting plate.

The wing attachment 34 comprises two wings 36 which extend rearwardly and outwardly away from respective opposing side walls of the opener body to respective outer ends so as to be arranged to form respective secondary furrows laterally offset on opposing sides of the knife forming the primary furrow. The wings are spaced upwardly and rearwardly in relation to the knife offset in opposing lateral directions at the rear end of the opener body. A secondary passage 38 is provided through a tube member supported rearward of the shank mount to extend from a secondary inlet arranged to communicate with the secondary delivery tube of the cultivator to a secondary outlet opening 40 comprised of two separate channels 42 each having a bottom opening in alignment with a respective one of the wings onto the rear end of which the channel is supported.

In use the opener is placed in the forward working direction so that the knife forms a primary furrow in the forward working direction in the ground. The primary passage diverts the primary material, for example fertilizer to the primary outlet in the bottom side of the opener body between the knife and the wings so as to deposit the primary material in the bottom of the primary furrow. The wings which trail the knife form secondary furrows offset laterally outward in opposing directions relative to the primary furrow as wall as being spaced upwardly therefrom for effectively widening the upper portion of the primary furrow such that the seed can be deposited through the secondary passage and deposited in the respective secondary furrows in parallel rows offset laterally outwardly and upwardly in relation to the primary material.

The bottom side of the opener body which locates the primary outlet opening therein is stepped in profile from the front end of the opener body mounting the knife thereon to the rear end of the opener body supporting the wings therein spaced upwardly in relation to the knife on the front end. The stepped profile of the bottom side thus comprises a front portion adjacent the front end of the opener which extends generally horizontally rearward to an upright step portion 48 which is substantially vertical and extends upward from the front portion 46 to a rear portion 50 of the bottom side which then extends generally horizontally rearward from the top end of the step portion to the rear end of the opener body supporting the wing attachment thereon.

The front portion 46 generally comprises a plate member which is fully enclosed between the two side walls from the front end of the opener body to a trailing edge 52 of the front portion so as to define the lowermost part of the opener body with the trailing edge 52 being located closer to the rear end of the opener body mounting the wing attachment thereon than the front end of the opener body mounting the knife thereon. In the illustrated embodiments the front portion 46 extends at a slight downward inclination from the front end to the trailing edge 52. The front portion has a hollow interior so that the top side of the plate member is fully open to the primary passage between the two side walls directly thereabove. By locating the trailing edge 52 nearer to the rear end of the opener body, the front portion spans in the working direction a majority of the length of the opener body from the knife mounted at the front end to the wing attachment mounted at the rear end of the opener body.

The step portion 48 is substantially vertical in orientation from the trailing edge of the front portion 46 at the bottom of the step portion to the top end of the step portion which is joined to the rear portion 50 so that the rear portion 50 extends substantially horizontally rearward therefrom to the rear end of the opener body.

The primary outlet opening 28 of the primary passage is primarily located in the step portion 48 to span in a substantially vertical plane from a leading bottom edge 54 of the outlet opening located at the trailing edge of the front portion to a trailing top edge 56 at the rear portion 50 spaced upwardly from the leading bottom edge and spaced slightly rearward therefrom.

The height of the primary outlet corresponds to the height or difference in elevation between the substantially horizontal front portion of the bottom side of the opener body and the substantially horizontal rear portion of the bottom side of the body. The height of the outlet opening further corresponds to a difference in elevation between the lowermost tip of the knife and the lowermost tip of the wing attachment or alternatively the difference in elevation between the knife mount supporting the knife on the front end of the opener body and the attachment of the wings at the rear of the body.

The substantially vertical orientation of the primary outlet opening results in a very short length of the outlet opening in a horizontal direction in the forward working direction between the leading and trailing edges thereof. Accordingly the front portion of the bottom side is much longer in the forward working direction than the horizontal distance between the top and bottom edge of the primary outlet opening. Furthermore by positioning the leading bottom edge of the primary outlet opening to be closed to the rear end of the opener body supporting the wing attachment thereon than the front end supporting the knife thereon, the outlet opening is accordingly positioned adjacent the rear end of the opener body while being spaced rearwardly from the front end of the opener body by the enclosed front portion of the bottom side. Locating the outlet opening closer to the rear end of the opener body provides some added shielding of the outlet opening from the wake of the knife at the front end of the opener body.

Figure 1:
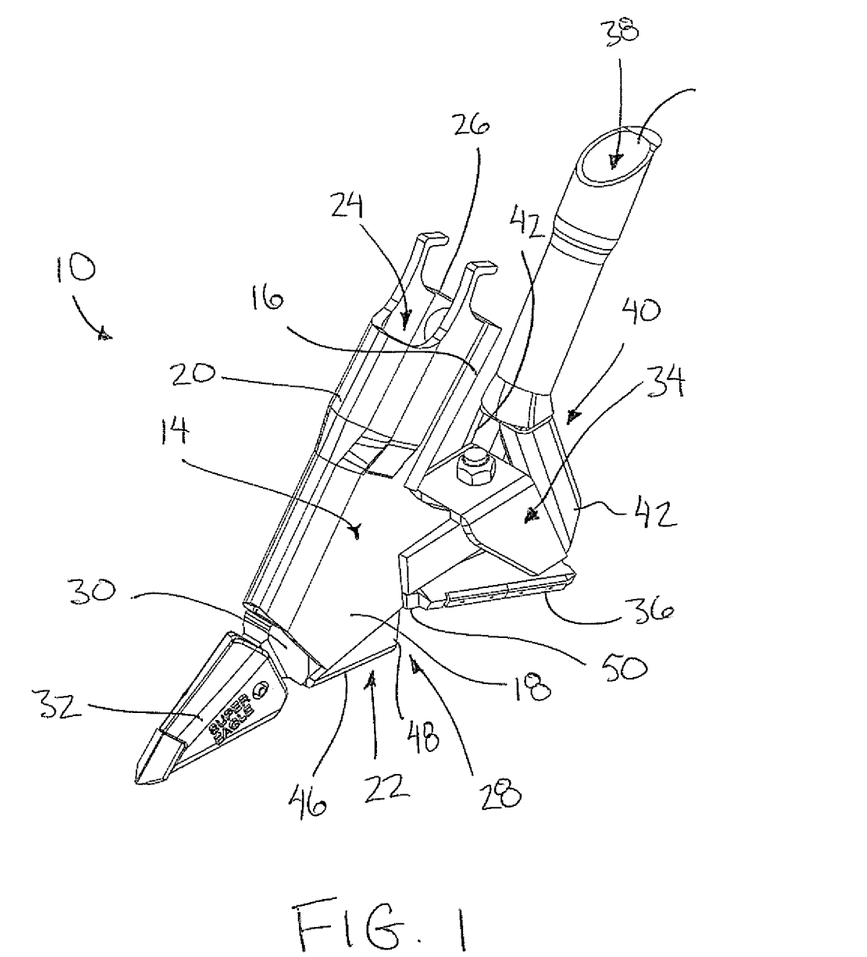
FIG. 1 is a perspective view of a first embodiment of a furrow opener.
Figure 2:
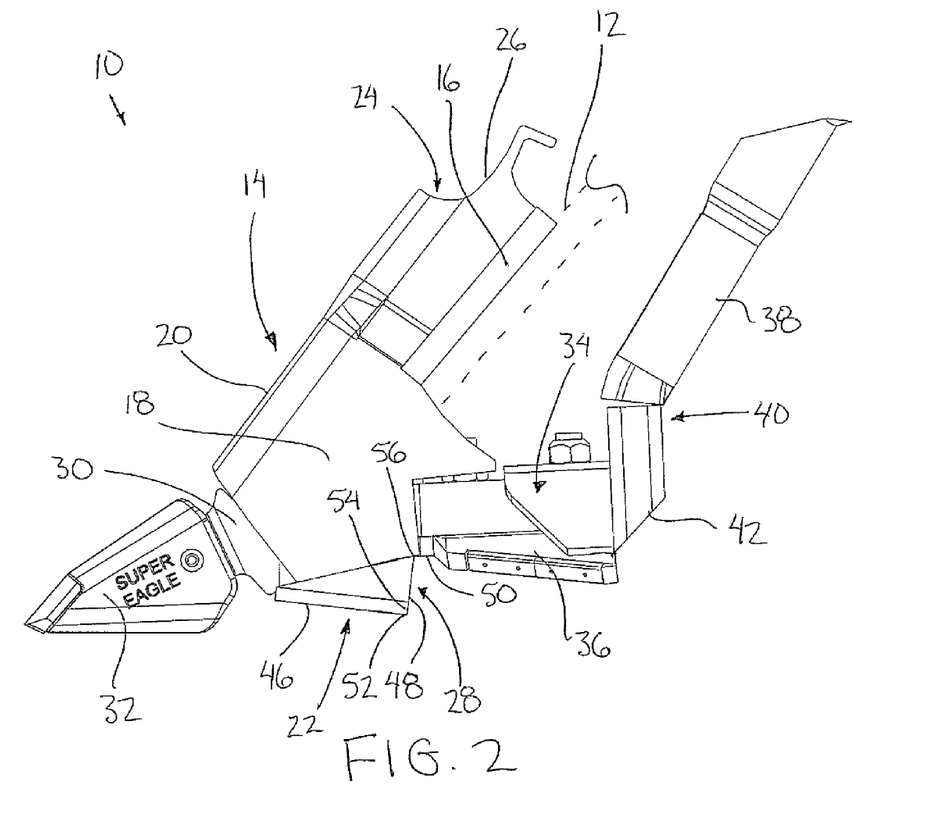
FIG. 2 is a side elevational view of the opener according to FIG. 1.
Figure 3:
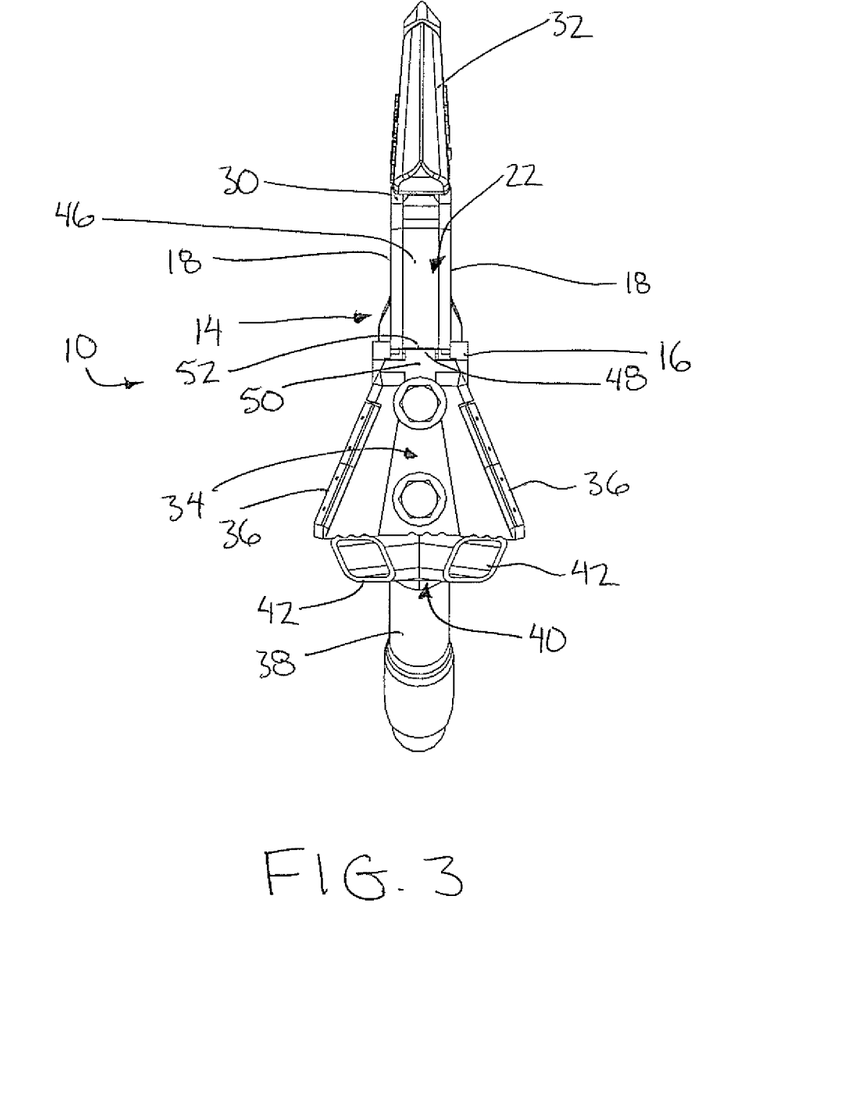
FIG. 3 is a bottom plan view of the opener according to FIG. 1.
Figure 4:
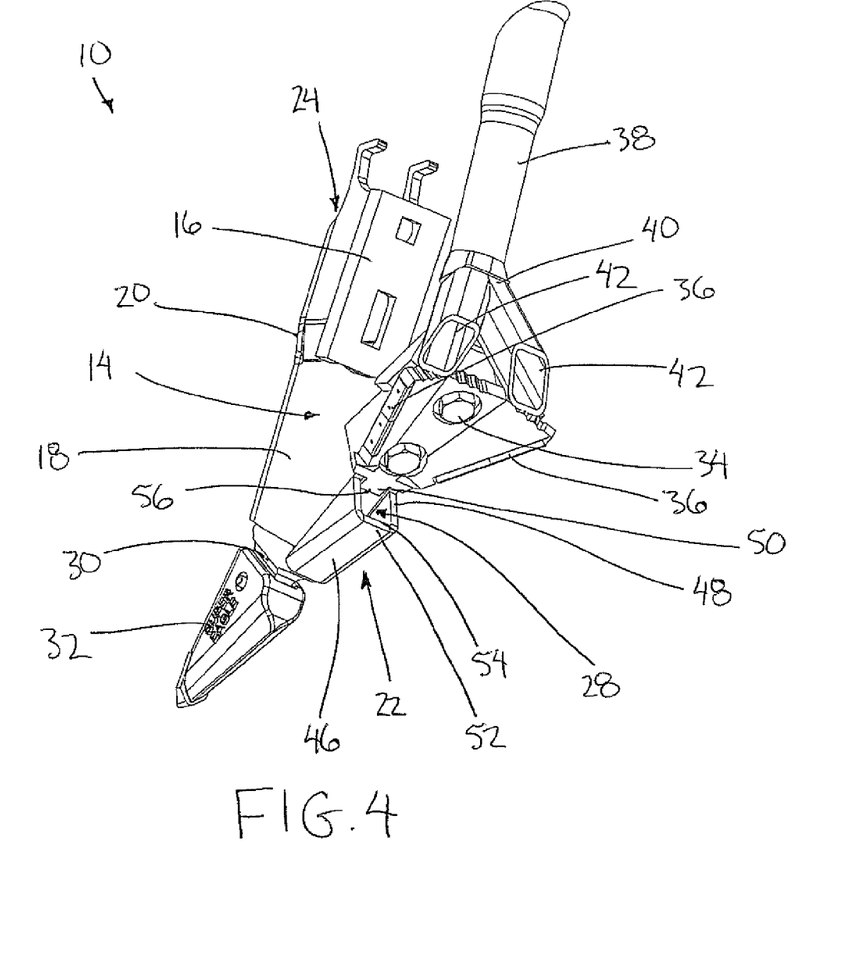
FIG. 4 is a perspective view illustrating a rear end and the bottom side of the opener according to FIG. 1.
Figure 5:
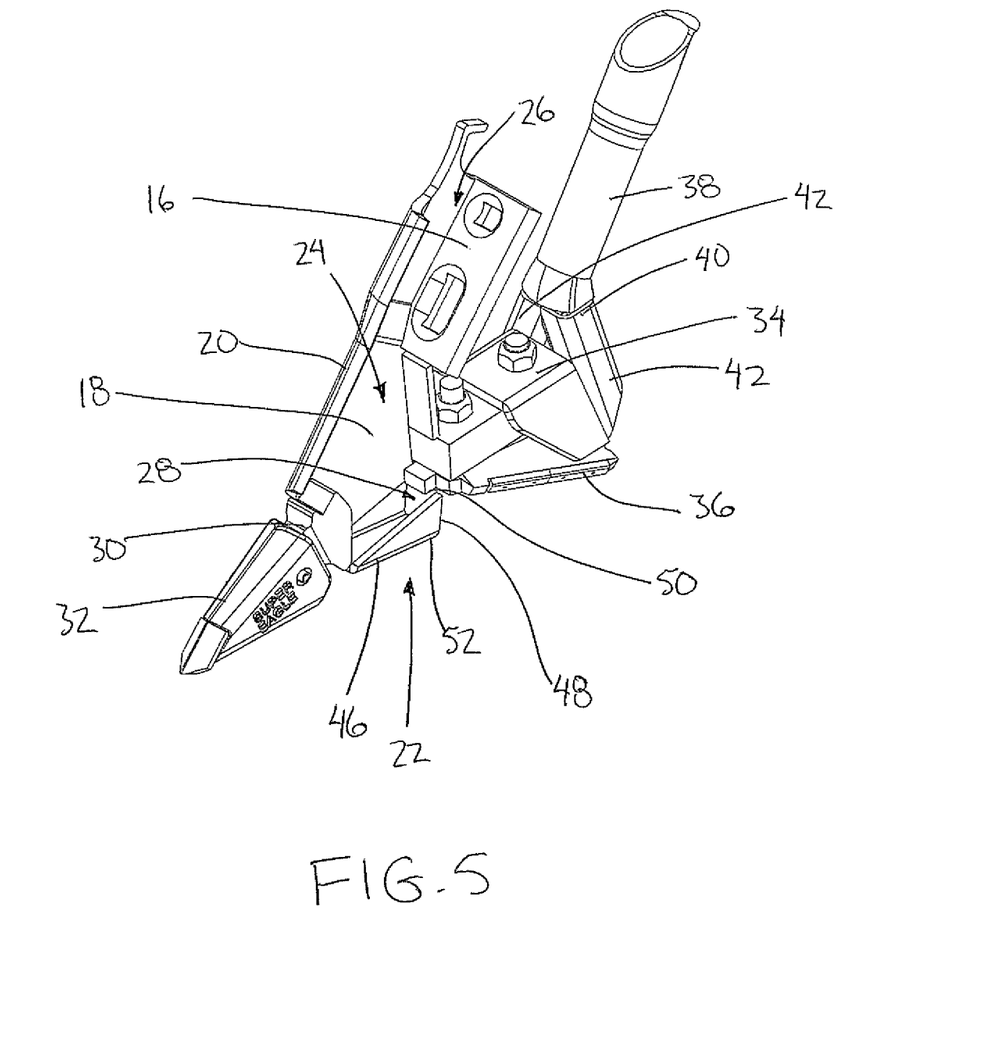
FIG. 5 is a perspective view of the opener according to FIG. 1 with one of the side walls of the opener body shown removed.

Turning now more particularly to the first embodiment of FIGS. 1 through 5, the rear portion is shown to have a minimal length in the working direction with the rear portion being fully enclosed between the step portion and the rear end of the opener body. In this instance the primary outlet opening is wholly located in a single upright plane located entirely in the upright step portion of the bottom side of the opener body. Due to the substantially vertical orientation of the single upright plane locating the primary outlet opening therein having only a slight rearward inclination, the entire primary outlet opening is rear facing instead of being substantially downward facing as in prior art arrangements.

Figure 6:
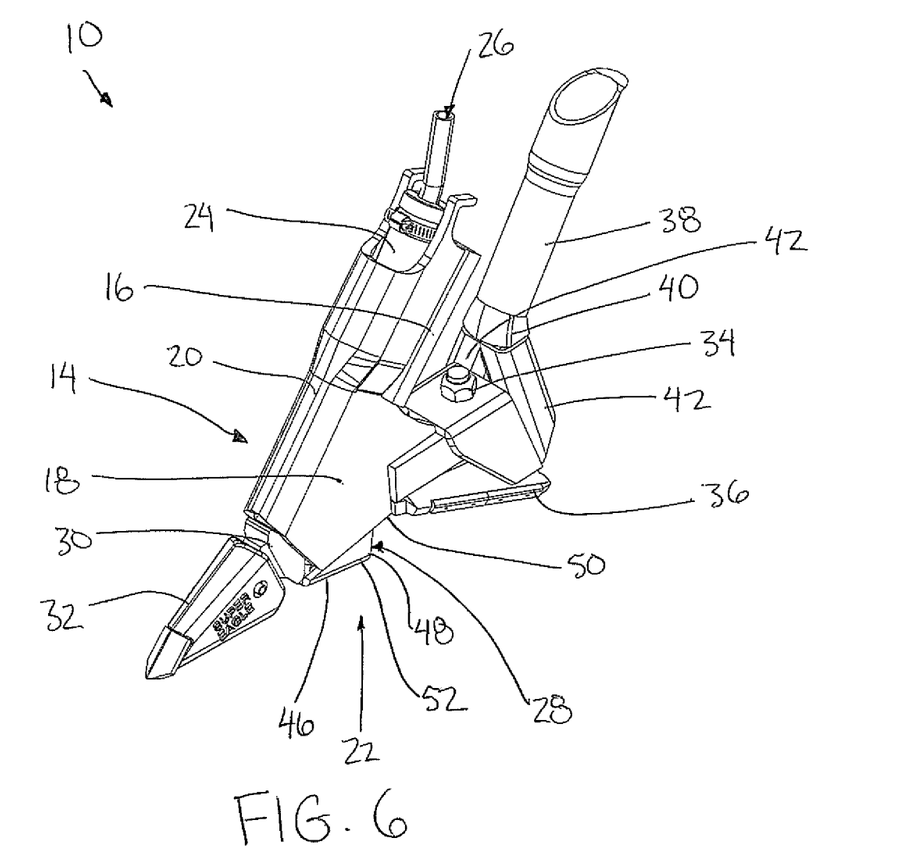
FIG. 6 is a perspective view of a second embodiment of the furrow opener.
Figure 7:
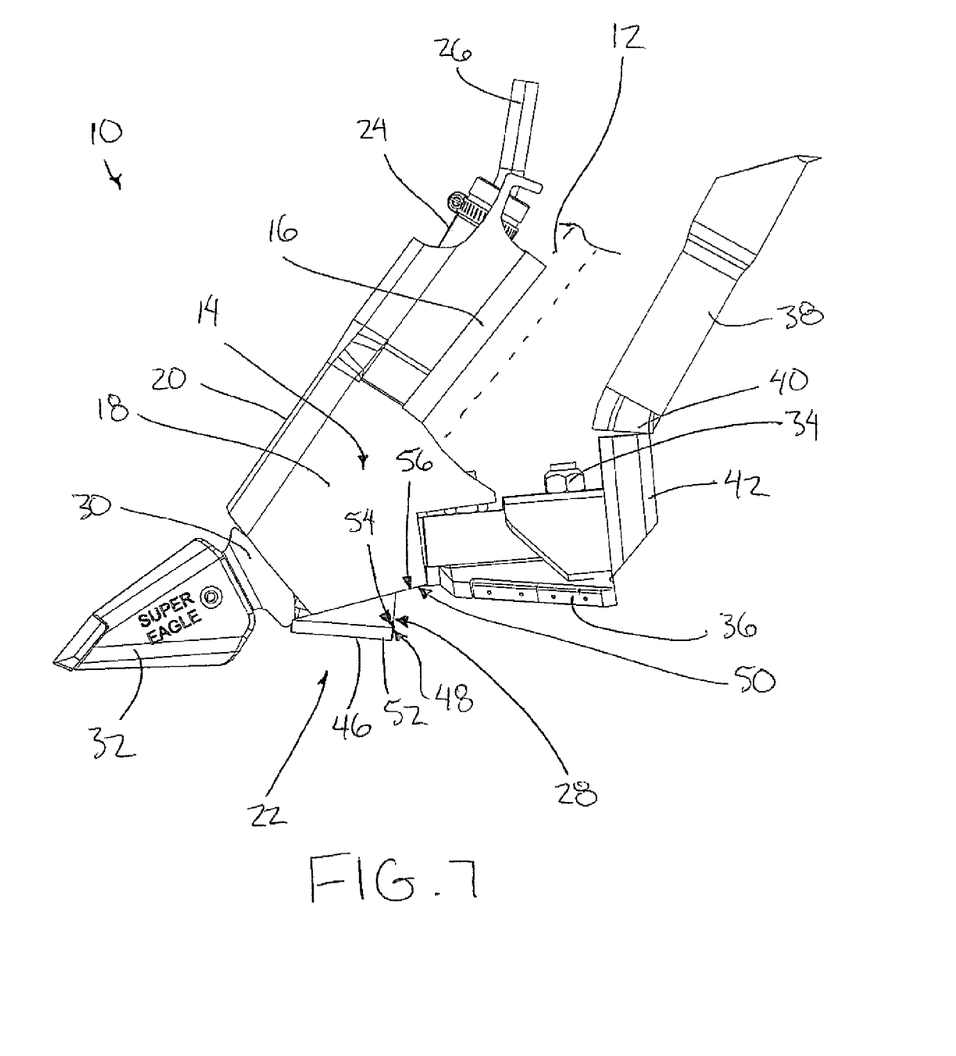
FIG. 7 and FIG. 8 are side elevational and bottom plan views of the opener according to FIG. 6.
Figure 8:
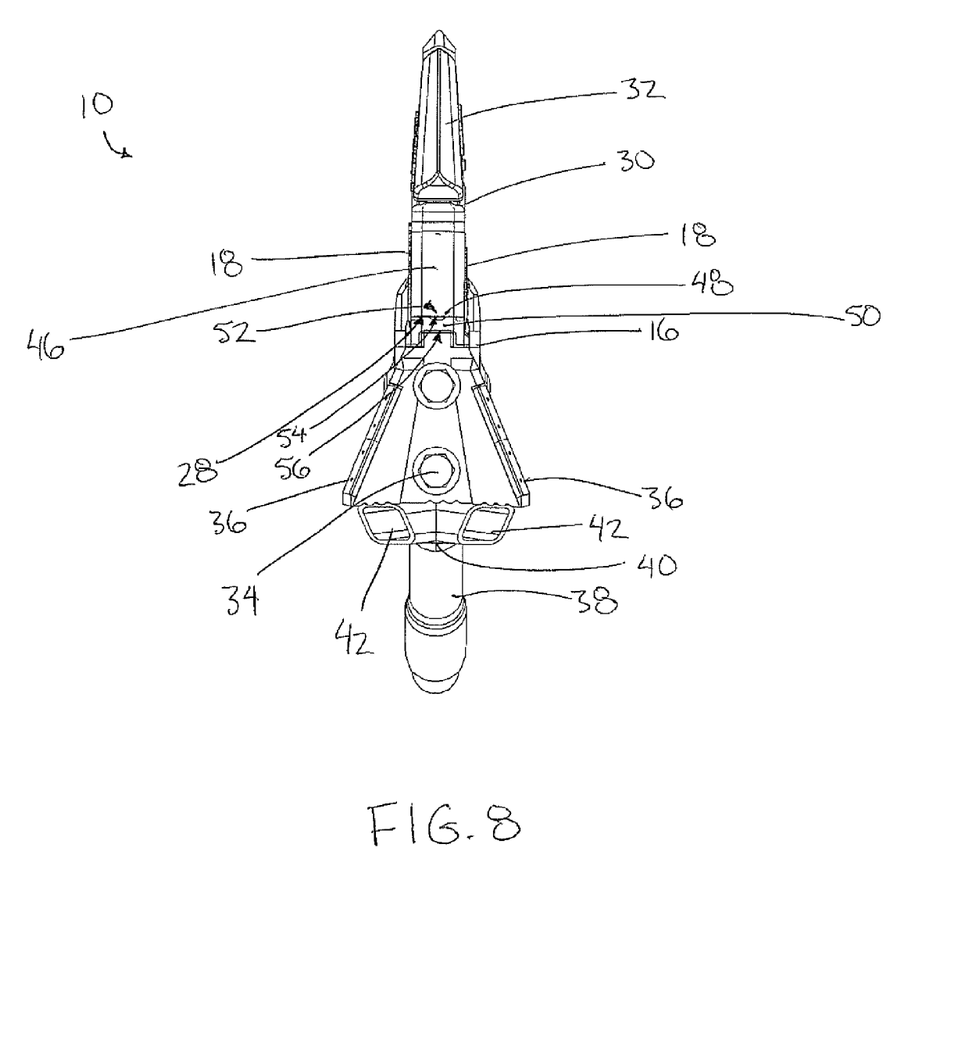
Figure 9:
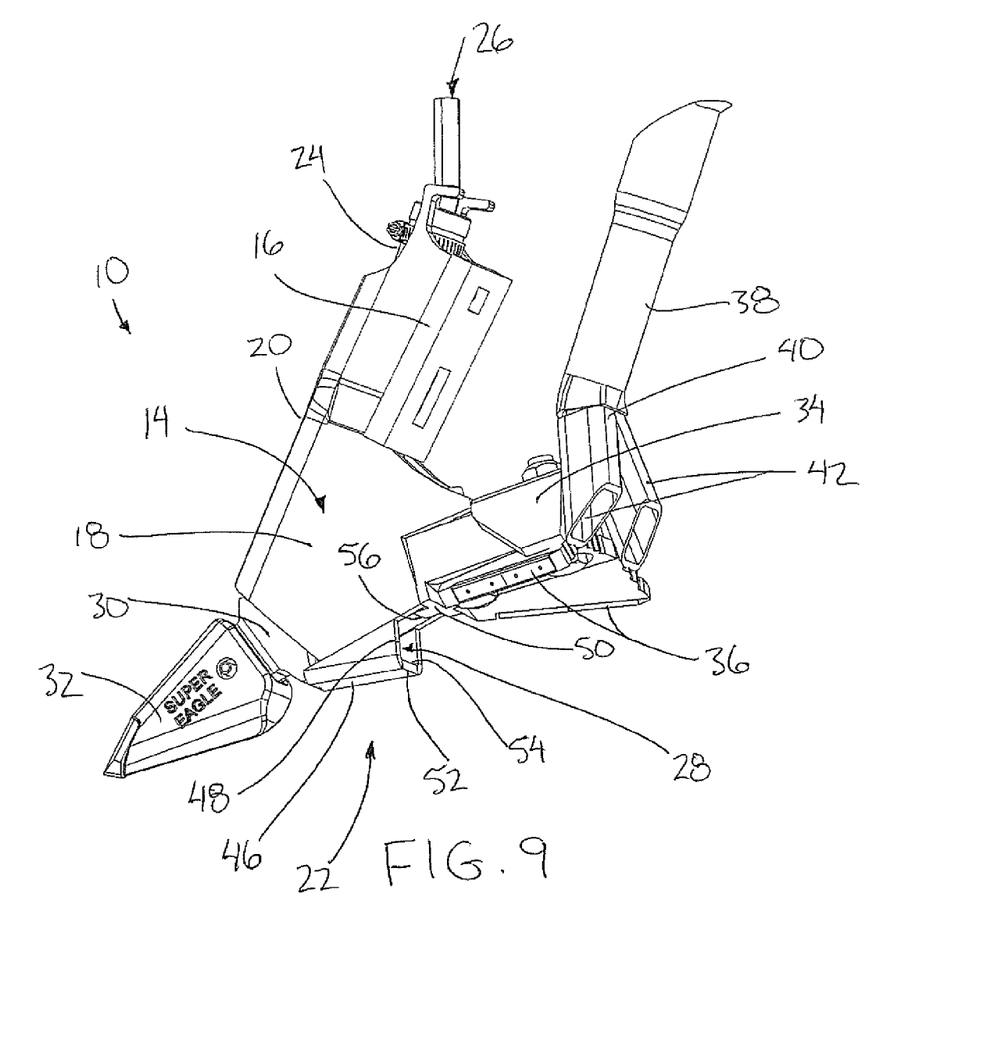
FIG. 9 is a perspective view illustrating a rear end and a bottom side of the opener according to FIG. 6.
Figure 10:
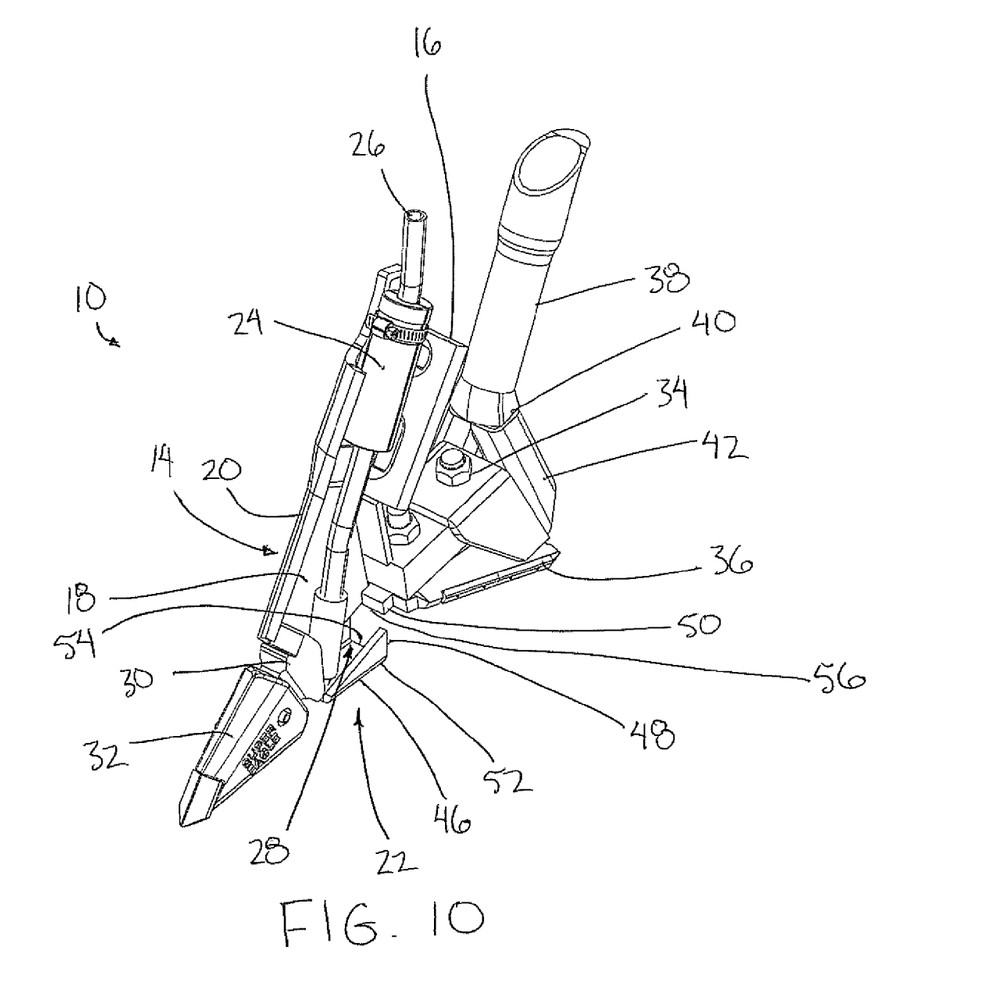
FIG. 10 is a front perspective view of the opener according to FIG. 6 in which one of the side walls of the opener body is shown removed.

Referring now to the embodiment of FIGS. 6 through 10, the front portion is shown to be shorter than the previous embodiment so that the step portion is spaced ahead of the rear end of the opener body sufficiently that a portion of the primary outlet opening can be located in the rear portion between the side walls of the opener body as well as being primarily located in the step portion. The opening in this instance is fully open between the step portion and rear portion of the bottom side of the opener body. The majority of the primary outlet opening remains in the step portion so that the outlet opening remains primarily rear facing within only a small upper portion of the primary outlet opening above the step portion being near horizontal in orientation so as to be somewhat downward facing.

Use of the opener 10 described herein in which there is a front portion ahead of a step portion locating the primary outlet opening therein results in the front portion deflecting the wake of earth displaced by the knife forming the primary furrow downward and away from the outlet opening in the step portion. Furthermore the stepped profile of the bottom side of the opener results in the outlet opening in the step portion being more vertical in orientation than the front portion so as to further shield the outlet opening from plugging by earth displaced during the furrow formation by the knife.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A furrow opener for mounting on a cultivator shank for being supported for movement together with the cultivator shank in a forward working direction for depositing into the ground a primary material from a primary delivery tube and a secondary material from a secondary delivery tube, the opener comprising:

an opener body arranged to be mounted on the cultivator shank, the opener body including a bottom side extending rearward from a front end to a rear end of the opener body;

a knife arranged to be supported on the front end of the opener body to extend downwardly and forwardly from the opener body so as to be arranged to form a primary furrow in the ground in the forward working direction;

a primary passage extending through the opener body from a primary inlet opening arranged to communicate with the primary delivery tube to a primary outlet opening in the bottom side of the opener body so as to be arranged to deposit the primary material in the primary furrow therefrom;

at least one wing arranged to be supported on the rear end of the opener body to extend laterally outward from the opener body so as to be arranged to form a secondary furrow in the ground in the forward working direction offset laterally in relation to the primary furrow; and a secondary passage extending from a secondary inlet arranged to communicate with the secondary delivery tube to a secondary outlet opening at a rear end of said at least one wing so as to be arranged to deposit the secondary material in the secondary furrow;

the bottom side of the opener body being stepped in profile such that the bottom side of the opener body comprises:

a front portion which is enclosed at the bottom side and which extends rearwardly from the front end of the opener body to a trailing edge; and a step portion which is upright in orientation and extends upwardly from the trailing edge of the front portion so as to be more vertical in orientation than the front portion;

the primary outlet opening being primarily located in the step portion of the bottom side of the opener body such that the primary outlet opening primarily faces rearwardly.

2. The opener according to claim 1 wherein the front portion of the bottom side comprises a lowermost portion of the opener body.

3. The opener according to claim 1 wherein the front portion of the bottom side of the opener body is substantially horizontal in orientation.

4. The opener according to claim 1 wherein the front portion of the bottom side of the opener body spans in the working direction a majority of a length of the opener body between the front end and the rear end of the opener body.

5. The opener according to claim 1 wherein the front portion of the bottom side of the opener body spans in the working direction a distance which is greater than a horizontal distance between opposed top and bottom edges of the primary outlet opening.

6. The opener according to claim 1 wherein the primary outlet opening is nearer to the rear end of the opener body supporting said at least one wing thereon than the front end of the opener body supporting the knife thereon.

7. The opener according to claim 1 wherein the primary outlet opening extends upwardly and rearwardly from a leading bottom edge to a trailing top edge, the leading bottom edge of the primary outlet opening being nearer to the rear end of the opener body supporting said at least one wing thereon than the front end of the opener body supporting the knife thereon.

8. The opener according to claim 1 wherein the front portion of the bottom side of the opener body extends rearwardly at a downward inclination from the front end supporting the knife thereon to the primary outlet opening in the step portion.

9. The opener according to claim 1 wherein the step portion is substantially vertical in orientation.

10. The opener according to claim 1 wherein the step portion spans a height corresponding to a difference in elevation between the knife and said at least one wing.

11. The opener according to claim 1 wherein the primary outlet opening extends between a leading bottom edge at the trailing edge of the front portion of the bottom side of the body and a trailing top edge which is spaced upwardly and rearwardly from the leading bottom edge spaced forwardly of said at least one wing.

12. The opener according to claim 1 wherein the front portion of the bottom side of the opener body comprises a plate member in which a top side of the plate is open to the primary passage directly thereabove.

13. The opener according to claim 1 wherein the bottom side of the opener body further comprises a rear portion extending rearwardly from a top end of the step portion to the rear end of the body supporting said at least one wing thereon.

14. The opener according to claim 13 wherein the front portion and the rear portion are substantially horizontal in orientation and the step portion is upright in orientation between the front portion and the rear portion.

15. The opener according to claim 13 wherein the primary outlet opening is located in the step portion and rear portion of the bottom side of the opener body.

16. The opener according to claim 1 wherein the primary outlet opening is wholly located in the step portion of the bottom side of the opener body which is upright in orientation such that the primary outlet opening only faces rearwardly.

17. A furrow opener for mounting on a cultivator shank for being supported for movement together with the cultivator shank in a forward working direction for depositing into the ground a primary material from a primary delivery tube and a secondary material from a secondary delivery tube, the opener comprising:

an opener body arranged to be mounted on the cultivator shank, the opener body including a bottom side extending rearward from a front end to a rear end of the opener body;

a knife arranged to be supported on the front end of the opener body to extend downwardly and forwardly from the opener body so as to be arranged to form a primary furrow in the ground in the forward working direction;

a primary passage extending through the opener body from a primary inlet opening arranged to communicate with the primary delivery tube to a primary outlet opening in the bottom side of the opener body so as to be arranged to deposit the primary material in the primary furrow therefrom;

at least one wing arranged to be supported on the rear end of the opener body to extend laterally outward from the opener body so as to be arranged to form a secondary furrow in the ground in the forward working direction offset laterally in relation to the primary furrow; and a secondary passage extending from a secondary inlet arranged to communicate with the secondary delivery tube to a secondary outlet opening at a rear end of said at least one wing so as to be arranged to deposit the secondary material in the secondary furrow;

the bottom side of the opener body being stepped in profile between the knife and said at least one wing such that the bottom side of the opener body comprises:

a front portion which is enclosed at the bottom side and which extends rearwardly from the front end of the opener body to a trailing edge; and a step portion which is upright in orientation and extends upwardly from the trailing edge of the front portion so as to be more vertical in orientation than the front portion;

the primary outlet opening being primarily located in the step portion of the bottom side of the opener body such that the primary outlet opening primarily faces rearwardly.

18. A furrow opener for mounting on a cultivator shank for being supported for movement together with the cultivator shank in a forward working direction for depositing into the ground a primary material from a primary delivery tube and a secondary material from a secondary delivery tube, the opener comprising:

an opener body arranged to be mounted on the cultivator shank, the opener body including a bottom side extending rearward from a front end to a rear end of the opener body;

a knife arranged to be supported on the front end of the opener body to extend downwardly and forwardly from the opener body so as to be arranged to form a primary furrow in the ground in the forward working direction;

a primary passage extending through the opener body from a primary inlet opening arranged to communicate with the primary delivery tube to a primary outlet opening in the bottom side of the opener body so as to be arranged to deposit the primary material in the primary furrow therefrom;

at least one wing arranged to be supported on the rear end of the opener body to extend laterally outward from the opener body so as to be arranged to form a secondary furrow in the ground in the forward working direction offset laterally in relation to the primary furrow; and a secondary passage extending from a secondary inlet arranged to communicate with the secondary delivery tube to a secondary outlet opening at a rear end of said at least one wing so as to be arranged to deposit the secondary material in the secondary furrow;

the bottom side of the opener body being stepped in profile such that the bottom side of the opener body comprises:

a front portion which is enclosed at the bottom side and which extends rearwardly from the front end of the opener body to a trailing edge;

a step portion which is upright in orientation and extends upwardly from the trailing edge of the front portion so as to be more vertical in orientation than the front portion; and a rear portion extending rearwardly from a top end of the step portion to the rear end of the body supporting said at least one wing thereon;

the primary outlet opening being primarily located in the step portion of the bottom side of the opener body such that the primary outlet opening primarily faces rearwardly.

\* \* \* \* \*